United States Patent
Cordourier Maruri et al.

(10) Patent No.: US 11,860,288 B2
(45) Date of Patent: Jan. 2, 2024

(54) METHODS AND APPARATUS TO DETECT THE LOCATION OF SOUND SOURCES EXTERNAL TO COMPUTING DEVICES

(71) Applicant: Intel Corporation, Santa Clara, CA (US)

(72) Inventors: Hector Cordourier Maruri, Guadalajara (MX); Adam Kupryjanow, Gdańsk (PL); Karol Duzinkiewicz, Banino (PL); Jose Rodrigo Camacho Perez, Guadalajara (MX); Paulo Lopez Meyer, Zapopan (MX); Julio Zamora Esquivel, Zapopan (MX); Alejandro Ibarra Von Borstel, Zapopan (MX); Jonathan Huang, Pleasanton, CA (US)

(73) Assignee: INTEL CORPORATION, Santa Clara, CA (US)

( * ) Notice: Subject to any disclaimer, the term of this patent is extended or adjusted under 35 U.S.C. 154(b) by 675 days.

(21) Appl. No.: 16/914,064

(22) Filed: Jun. 26, 2020

(65) Prior Publication Data
US 2020/0326401 A1   Oct. 15, 2020

(51) Int. Cl.
*G01S 3/808* (2006.01)
*G01S 3/86* (2006.01)

(52) U.S. Cl.
CPC .............. *G01S 3/8083* (2013.01); *G01S 3/86* (2013.01)

(58) Field of Classification Search
CPC ................................ G01S 3/8083; G01S 3/86
See application file for complete search history.

(56) References Cited

U.S. PATENT DOCUMENTS

2020/0092643 A1   3/2020   Maruri et al.

FOREIGN PATENT DOCUMENTS

CN   110517705 A   11/2019

OTHER PUBLICATIONS

Knapp et al. "The Generalized Correlation Method for Estimation of Time Delay," IEEE Transactions on Acoustics, Speech, and Signal Processing, vol. ASSP-24, No. 4, Aug. 1976 (8 pages).
European Patent Office, "Extended European Search Report," issued in connection with European Application No. 20216300.2, dated Jun. 17, 2021, 11 pages.

*Primary Examiner* — Isam A Alsomiri
*Assistant Examiner* — Abdallah Abulaban
(74) *Attorney, Agent, or Firm* — Hanley, Flight & Zimmerman, LLC

(57) ABSTRACT

Methods, apparatus, systems, and articles of manufacture to detect the location of sound sources external to computing devices are disclosed. An apparatus, to determine a direction of a source of a sound relative to a computing device, includes a cross-correlation analyzer to generate a vector of values corresponding to a cross-correlation of first and second audio signals corresponding to the sound. The first audio signal is received from a first microphone of the computing device. The second audio signal is received from a second microphone of the computing device. The apparatus also includes a location analyzer to use a machine learning model and a set of the values of the vector to determine the direction of the source of the sound.

24 Claims, 7 Drawing Sheets

METHODS AND APPARATUS TO DETECT THE LOCATION OF SOUND SOURCES EXTERNAL TO COMPUTING DEVICES

FIELD OF THE DISCLOSURE

This disclosure relates generally to computing devices, and, more particularly, to methods and apparatus to detect the location of sound sources external to computing devices.

BACKGROUND

Many computing devices (e.g., laptops, tablets, smartphones, etc.) include at least one microphone to capture sound generated external to the device (e.g., the voice of a user). In many circumstances, such computing devices are implemented with at least two microphones spaced slightly apart to facilitate the reduction and/or cancellation of background noise. Frequently, such noise reduction is accomplished through orthogonal beamforming directed towards the typical location of the user (e.g., in front of a laptop).

Figure 1:
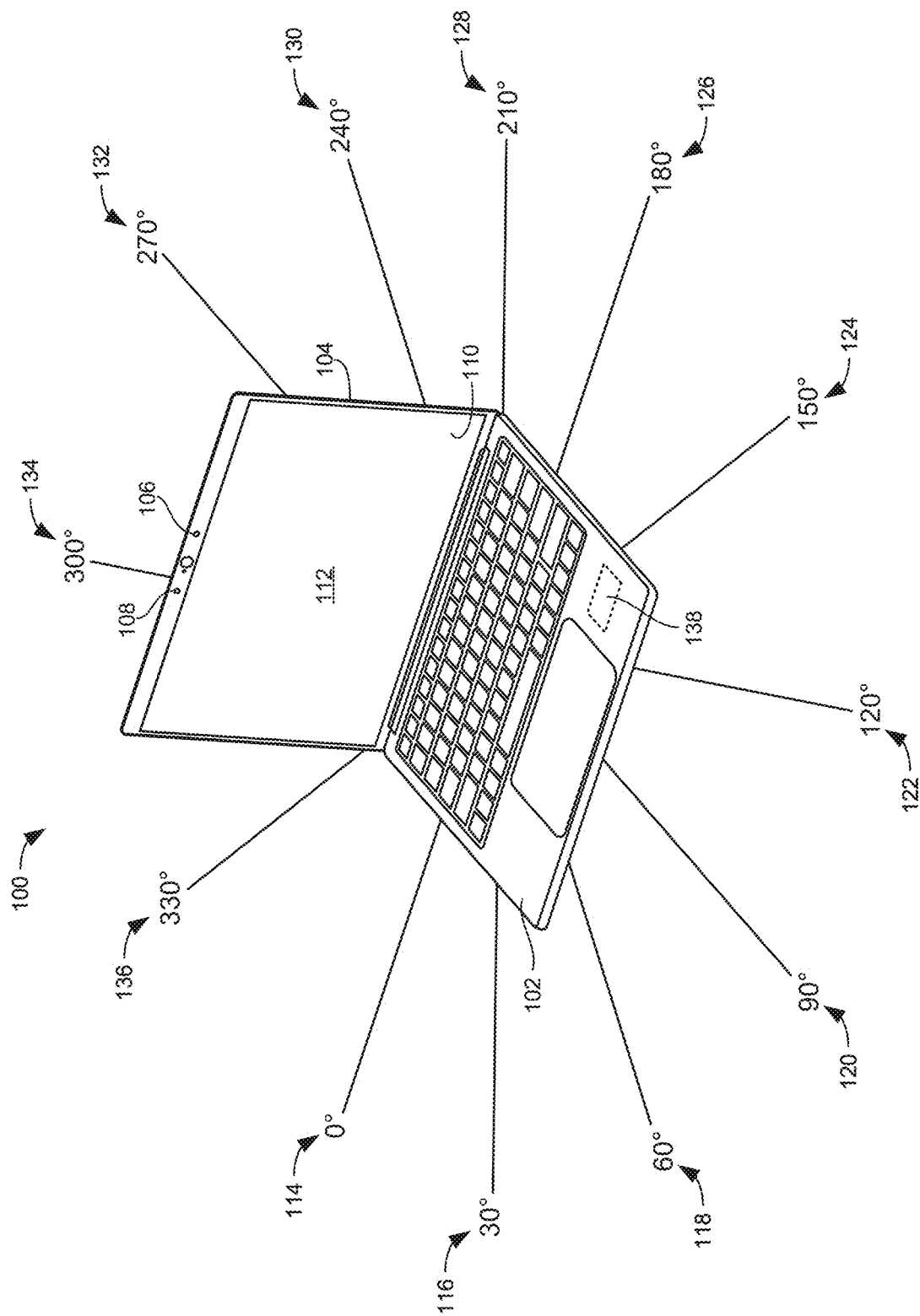
FIG. 1 illustrates an example computing device constructed in accordance with teachings disclosed herein.

The figures are not to scale. In general, the same reference numbers will be used throughout the drawing(s) and accompanying written description to refer to the same or like parts. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to measurements that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time +/−1 second.

DETAILED DESCRIPTION

As computing devices (e.g., laptops, tablets, smartphones, desktop computers, etc.) are adapting to the new smart office and home environments, spatial location of audio sources is an important feature. Identifying the location of a sound source can be used to determine whether the sound comes from a user of a computing device, from some interference source, or from some other source that could be used for context awareness. Sound source location detection also enables the use of different types of audio enhancement techniques that either seek to isolate and/or focus on a sound when relevant to the operation of a computing device (e.g., the sound of a user speaking) or to seek to reduce and/or cancel out the sound when not relevant to the operation of the computing device (e.g., interfering background noise). More particularly, sound source location detection can be used to enhance the selected audio source for speech recognition, speech separation, speaker identification, audio event detection, etc. Many such applications depend upon audio location detection to occur in substantially real-time.

One approach to detect the location of a sound source is through the use of an array of audio sensors (e.g., microphones). Due to the spacing of the microphones in an array, different ones of the microphones will capture a sound at slightly different times based on the distance the sound must travel from the source to the different microphones. This delay in different microphones registering a particular sound is commonly referred to as the time difference of arrival (TDOA) of the sound. Based on principles of triangulation and the fixed spacing of the microphones, it is possible to use the TDOA of a sound to determine the location of the source of the sound relative to the microphones and, thus, relative to the computing device containing the microphones.

High quality sound location detection is often handled with relatively large arrays of microphone containing 4 or more elements. The relatively large number of microphones enables different microphones to face in different directions so as to reliably capture sound originating from any direction. Furthermore, increasing the number of microphones in an array increases the precision and accuracy with which audio source locations may be identified. However, there is a cost associated with increasing the number of microphones in a computing device due to an increased bill of materials (for the additional microphones). Further, processing the multiple audio channels associated with the different microphones often involves computationally intensive cross-correlations based on fast Fourier transform (FFT) calculations and/or deep learning algorithms. Thus, increasing the number of microphones also adds to the computing overhead needed to process the increased number of audio channels and/or may call for a dedicated digital signal processor (DSP), thereby, further adding to the bill of materials.

Many existing computing devices include only two microphones. However, the microphones are not typically used for purposes of sound source location detection. Rather, two microphones are implemented to facilitate the reduction and/or cancellation of background noise. Frequently, such noise reduction is accomplished through orthogonal beamforming directed towards the typical location of the user (e.g., in front of the computing device). The reason sound source location detection is not typically implemented using only two microphones is because the triangulation of the TDOA of sound captured by two microphones cannot be resolved to a single location. Rather, assuming sound sources are in a plane that is parallel to a line extending between the two microphones, there are typically two possible source locations (that are geometric complements of one another) that will have the same TDOA for a sound. Sound sources may not necessarily be in a plane that is parallel to a line extending between the microphones, even if the source is stationary because the orientation of computing device may change. As a result, when three-dimensional space is taken into account, there may be more than two possible source locations corresponding to a particular TDOA of sound and the determination of such is dependent on the orientation of the computing device. In practical terms, while using triangulation based on TDOA analysis is possible with only two microphones, implementations of such are limited to only 180° of the surrounding environment (e.g., only in front of the computing device or only behind the computing device) and limited to when the computing device is in a particular orientation.

Examples disclosed herein enable the determination of the direction or location of a source of sound across 360° of space surrounding a computing device based on feedback from two microphones without additional feedback from additional microphones. Thus, some examples are able to distinguish between a first source of sound located in from of the computing device and a second source of sound located behind the computing device, even when the sources are at complementary geometric positions relative to the two-microphones. Specifically, unlike existing approaches that rely on triangulation of TDOA measures, examples disclosed herein determine the location or direction of a source of a sound through the use of artificial intelligence.

Artificial intelligence (AI), including machine learning (ML), deep learning (DL), and/or other artificial machine-driven logic, enables machines (e.g., computers, logic circuits, etc.) to use a model to process input data to generate an output based on patterns and/or associations previously learned by the model via a training process. For instance, the model may be trained with data to recognize patterns and/or associations and follow such patterns and/or associations when processing input data such that other input(s) result in output(s) consistent with the recognized patterns and/or associations.

Many different types of machine learning models and/or machine learning architectures exist. In some examples, a shallow neural network model is used. As used herein, a shallow neural network means a neural network that has no more than one hidden layer. This is distinguishable from a deep neural network, which has many hidden layers. Although examples disclosed herein may be implemented with a deep neural network, using a shallow neural network model is advantageous because it requires less computational capacity, thereby increasing efficiency relative to deep neural network solutions. Furthermore, testing has shown that example shallow neural network models disclosed herein can estimate the direction of the source of a sound with greater than 95% accuracy. Thus, examples disclosed herein avoid the cost of additional components (e.g., additional microphones) and the associated burdens on computational overhead that is present in known sound source location detection systems.

In general, machine learning models/architectures that are suitable to use in the example approaches disclosed herein will be any type of classifier capable of classifying a particular input (e.g., feedback from two microphones) into many (e.g., more than two) outputs. More particularly, in some examples, the neural network is defined to have a particular number of outputs corresponding to different angular intervals of 360° space. For instance, 12 different outputs may correspond to 12 different classifications associated with 30 intervals to fully cover 360° of rotation. Thus, the higher the number of outputs for the neural network, the greater the resolution of the location detection. However, increasing the number of outputs also increases the size and/or complexity of the neural network and, thus, the associated memory and/or processing requirements. In some examples, the neural network is defined to have a no-audio output separate from the outputs associated with particular angles (e.g., angular intervals) across 360° space to account for inputs that either cannot otherwise be classified and/or that correspond to moments when no sound is detected.

In general, implementing a ML/AI system involves two phases: a learning/training phase and an inference phase. In the learning/training phase, a training algorithm is used to train a model to operate in accordance with patterns and/or associations based on, for example, training data. In general, the model includes internal parameters that guide how input data is transformed into output data, such as through a series of nodes and connections within the model to transform input data into output data. Additionally, hyperparameters are used as part of the training process to control how the learning is performed (e.g., a learning rate, a number of layers to be used in the machine learning model, etc.). Hyperparameters are defined to be training parameters that are determined prior to initiating the training process.

Different types of training may be performed based on the type of ML/AI model and/or the expected output. For example, supervised training uses inputs and corresponding expected (e.g., labeled) outputs to select parameters (e.g., by iterating over combinations of select parameters) for the ML/AI model that reduce model error. As used herein, labelling refers to an expected output of the machine learning model (e.g., a classification, an expected output value, etc.). Alternatively, unsupervised training (e.g., used in deep learning, a subset of machine learning, etc.) involves inferring patterns from inputs to select parameters for the ML/AI model (e.g., without the benefit of expected (e.g., labeled) outputs).

In examples disclosed herein, ML/AI models are trained using stochastic gradient descent in a supervised manner. However, any other training algorithm may additionally or alternatively be used. Training is accomplished using a training set of feedback signals from two microphones capturing sounds generated at known angular positions relative to the microphones (and the associated computing device). The known positions of the feedback signals are used to label the training dataset so that the neural network can compare outputs (e.g., estimated locations of the sound source) to the ground truth (e.g., known positions of the sound source) and adjust the model accordingly. In examples disclosed herein, training is performed until an acceptable amount of error is achieved (e.g., less than 5% error). Training is performed using hyperparameters that control how the learning is performed (e.g., a learning rate, a number of layers to be used in the machine learning model, etc.). In some examples, the training data is sub-divided into a first set of data for training the machine learning model and a second set of data for validating the machine learning model. In some examples, the training data may also be divided into a third set of data for testing the machine learning model.

In some examples, the training process may be performed multiple times to develop multiple different models specific to different orientations of a computing device. Additionally or alternatively, in some examples, the training dataset may include feedback signals from the two microphones associated with different orientations of the computing device such that a single machine learning model may be trained to determine the location of a sound source despite changes to the orientation of the computing device.

Once training is complete, the model is deployed for use as an executable construct that processes an input and provides an output based on the network of nodes and connections defined in the model. In some examples, the model is stored locally on the computing device that is to implement or execute the model.

Once trained, the deployed model may be operated in an inference phase to process data. In the inference phase, data to be analyzed (e.g., live data) is input to the model, and the model executes to create an output. This inference phase can be thought of as the AI "thinking" to generate the output based on what it learned from the training (e.g., by executing the model to apply the learned patterns and/or associations to the live data). In some examples, input data undergoes pre-processing before being used as an input to the machine learning model. Moreover, in some examples, the output data may undergo post-processing after it is generated by the AI model to transform the output into a useful result (e.g., a display of data, an instruction to be executed by a machine, etc.). More particularly, in examples disclosed herein, a determination of a location or direction of a source of sound may be used to generate or implement a response including determining a context of a computing device, adjusting the audio processing of feedback signals generated by the microphones to either isolate and/or focus on a detected sounds or to reduce and/or cancel out the detected sounds, identify spoken words through speech recognition, identify a speaker through voice recognition, detect a particular audio event associated with the captured sound, etc.

FIG. 1 illustrates an example computing device 100 constructed in accordance with teachings disclosed herein. In this example, the computing device 100 corresponds to a laptop with a base 102 and a lid 104. However, the computing devices 100 may correspond to any suitable type of computing device (e.g., a tablet, a smartphone, a desktop computer, etc.). The computing device 100 includes two spaced apart microphones 106, 108. In the illustrated example, the microphones 106, 108 are positioned on a front surface 110 of the lid 104 to face in a same direction as a screen 112 of the computing device 100 (e.g., a user facing direction).

For purposes of explanation, FIG. 1 also shows a number of azimuthal angles 114-136 distributed across 360 degrees of space surrounding the computing device 100. As shown in FIG. 1, the first angle 114 points to the left of the computing device 100 (from the perspective of a user facing the front (e.g., the screen 112) of the device) and is designated as the 0° position. Each successive angle 114-136 corresponds to an increment of 30° around the computing device 100 in a counter-clockwise direction beginning form the 0° position. Thus, in the illustrated example, the fourth angle 120 corresponds to the 90° position and is directly in front of the computing device 100, the seventh angle 126 corresponds to the 180° position and is to the right of the computing device (directly opposite the 0° position), and the tenth angle 132 corresponds to the 270° position and is directly behind the computing device 100 (directly opposite the 90° position). The particular positions of the angles 114-136 relative to the computing device 100 shown in FIG. 1 are for purposes of explanation only. Thus, the 0° position 114 may be defined in any direction relative to the computing device and the other angles may extend from there in either a clockwise or counter-clockwise direction. Furthermore, in some examples, the angular interval between adjacent ones of the angles 114-136 may be greater or smaller than 30° to designate a different number of angles that may be less than or more than the 12 angles shown in FIG. 1.

In the illustrated example, the computing device 100 includes an example sound source location analyzer 138 the is communicatively coupled with the microphones 106, 108 to receive and process audio feedback signals generated by the microphones 106, 108. More particularly, in some examples, the sound source location analyzer 138 implements a machine learning model that uses the feedback signals as inputs to generate an output identifying the particular angle 114-136 that corresponds to the direction associated with a source of a sound represented in the feedback signals. In some examples, the feedback signals generated by the microphones 106, 108 undergo pre-processing before they are analyzed using a neural network based on an associated machine learning model. More particularly, in some examples, the sound source location analyzer 138 calculates a vector corresponding to the cross-correlation of the two audio signals and the cross-correlation vector is used as the basis for the input to the machine learning model. In some examples, the vector corresponds to a generalized cross-correlation with phase transform (GCC-PHAT). GCC-PHAT analysis is commonly used to determine the time difference of arrival (TDOA) between two audio signals when the signals contain relatively little auto-correlation (e.g. relatively low reverberation, relatively rich frequency content sounds). Furthermore, GCC-PHAT analysis can make a system relatively robust to a certain amount of reverberation.

The analysis of two audio signals corresponding to a sound captured at slightly different times using GCC-PHAT in the time-domain generates a cross-correlation vector that typically includes a single peak or spike that is isolated to determine the delay or time difference between the two signals. In a typical TDOA analysis, this time delay is then used with triangulation calculations to determine a location or direction of the source of the sound.

Unlike traditional TDOA analysis that isolates and focuses on the peak value in the cross-correlation vector produced through GCC-PHAT analysis, examples disclosed herein use a plurality of values in the cross-correlation vector in addition to the peak value. More particularly, in some examples, a segment of values in the cross-correlation vector surrounding and including the peak value are identified and used as inputs to a machine learning model. This is diagrammatically illustrated in FIG. 2. As shown in the illustrated example, two separate signals 202, 204 are received on two separate channels corresponding to the two microphones 106, 108. As represented in the upper left corner of FIG. 2, the first signal 202 is slightly delayed relative to the second signal 204. As time advances, individual signal frames or audio blocks 206, 208 containing a particular number of samples of the audio signals 202, 204 (e.g., two particular time-domain vectors) are compared through a GCC-PHAT process to generate a cross-correlation vector 210. As shown in the illustrated example, the cross-correlation vector 210 includes a peak value 212 corresponding to a spike that is typically easily identifiable because most other values in the vector are at or near zero. However, as noted above, rather than merely isolating the peak value 212, examples disclosed herein identify a segment or portion 214 of the cross-correlation vector 210. The segment 214 is then provided as an input to a machine learning model executed by a location analyzer to determine the location or direction of the source of the sound captured by the microphones 106, 108 at the particular point in time corresponding to the signal frames 206, 208. In some examples, this process iterates across time such that new signal frames are analyzed to generate a new cross-correlation vectors from which a segment is isolated to feed into the machine learning model.

Figure 2:
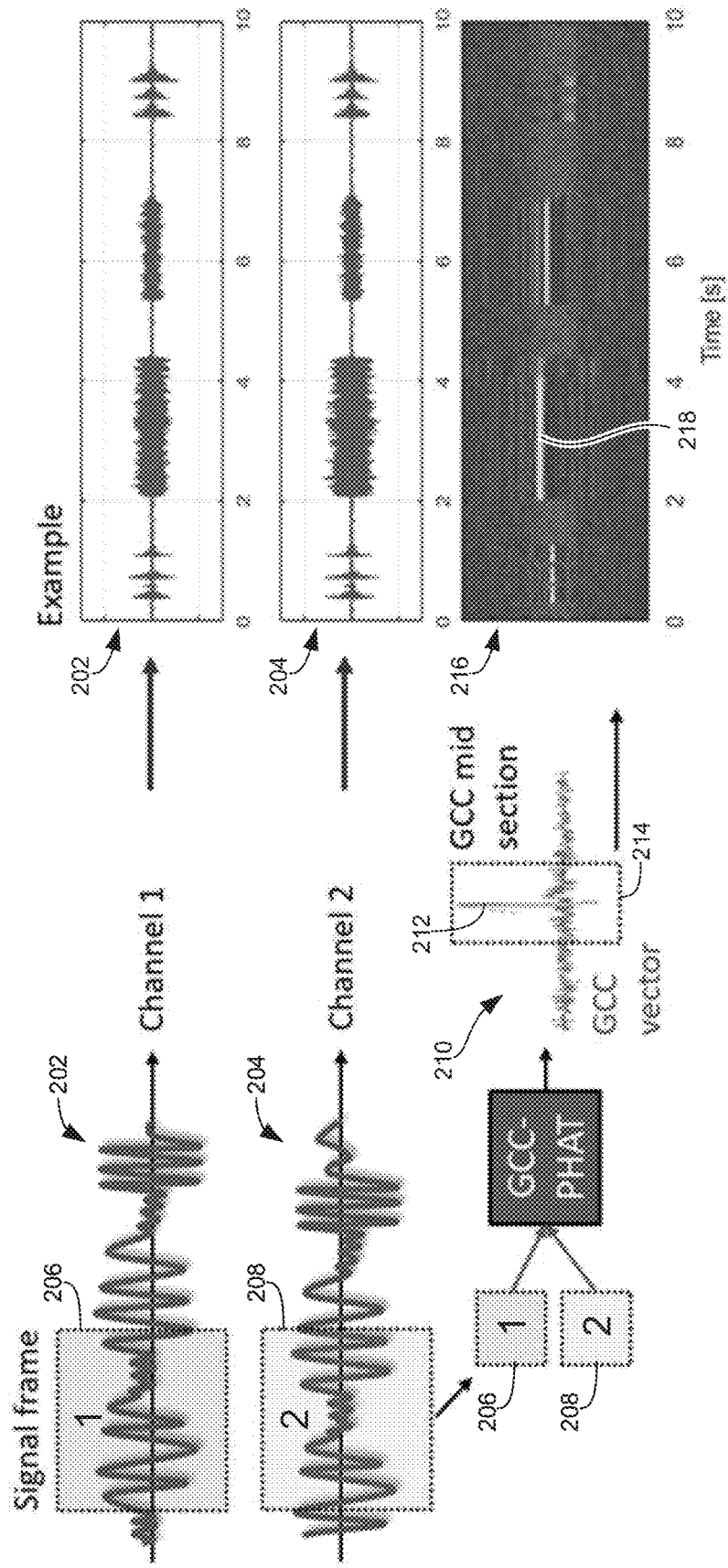
FIG. 2 illustrates an example process flow to generate inputs for a machine learning model implemented by the example sound source location analyzer of FIG. 1 to determine the location of a sound source.

The plot 216 in the bottom right corner of FIG. 2 represents a time series of multiple vector segments 214 corresponding to portions of successive cross-correlation vectors 210 calculated for different signal frames 206, 208 along a 10 second period of time aligned with the corresponding time period for the signals (shown in the upper right corner of FIG. 2). The light colored regions 218 in the plot 216 correspond to the peak value 212 included within the segments 214 of each successive cross-correlation vector 210 (represented vertically in the plot 216) in the time series. As can be seen in the illustrated example, the position of the peak value 212 is at different locations at different points in time indicative of different locations of the source of sound relative to the computing device 100. That is, the change in position of the peak value 212 within the vector 210 (and, thus, in the corresponding segment 214 of the vector) indicates a difference in the time of arrival of the underlying sounds, which can be used to predict a location or direction of the source of the sound. However, the source of a sound is ambiguous when there are only two microphones 106, 108 because multiple locations for the sound source are possible. This is the reason that examples disclosed herein consider all values in the segment 214 of the cross-correlation vector 210 rather than merely the position of the peak value 212. More particularly, the non-peak values in the segment 214 contain frequency-relevant information associated with the audio signals that can be used to reliably discriminate between signals coming from different but complementary locations relative to the microphones. That is, while a sound from two different but complementary locations may result in a cross-correlation vector 210 with the peak value 212 at the same position (due to the same TDOA for both locations), differences in the frequency information contained in the signals provided by each microphone can nevertheless enable sounds from one location to be distinguished from the other location. However, such information can only be analyzed if it is retained in the segment 214 that is provided as an input to the machine learning model rather than only considering the position of the peak value 212 as is done in traditional TDOA analysis.

In some examples, as shown in the illustrated example of FIG. 2, the segment 214 is a truncated mid-section of the cross-correlation vector 210. That is, in some examples, the segment 214 is centered in the cross-correlation vector 210 with the same and/or approximately the same number of values excluded from the cross-correlation vector 210 on either side of the segment 214. The proportion of the cross-correlation vector 210 included in the segment 214 may be any suitable proportion of the vector 210. In some examples, the segment 214 may include the entirety of the cross-correlation vector 210. However, to increase efficiency by reducing the amount of data to be processed (e.g., reducing computational overhead), the segment may include significantly less than all values in the cross-correlation vector 210 (e.g., less than 50%, less than 25%, less than 20%, less than 10%, etc.). On the other hand, the segment 214 is selected to include a sufficient proportion of the cross-correlation data (e.g., at least 1%, at least 5%, at least 10%, etc.) to enable the machine learning model to produce reliable estimates of the location of a sound source (e.g., to be able to discriminate between complementary locations associated with the same TDOA). In some examples, the number of elements in the cross-correlation vector 210 included in the segment 214 includes at least twice the number of samples corresponding to the maximum expected time delay between the two microphones 106, 108 detecting a particular sound. The maximum expected time delay for a sound to be detected by the two microphones 106, 108 is likely to be at extreme angles where the source of the sound is located to the side at a point that is collinear with both microphones 106, 108. Thus, in the illustrated example of FIG. 1, the extreme angles where the maximum expected delay would occur correspond to the first angle 114 (e.g., the 0° position) and the seventh angle 126 (e.g., the 180° position). Including at least twice the number of samples from the cross-correlation vector 210 than the number of samples corresponding to the maximum expected delay would ensure that the segment 214 includes values surrounding the peak value 212 regardless of the position of the peak value 212 within the cross-correlation vector 210.

Differences in the frequency information of the two audio signals generated by the two microphones 106, 108 for sounds originating from complementary sources may arise from the physical arrangement of the microphones 106, 108 in the computing device 100 relative to other components in the computing device 100 and how the microphones 106, 108 and other components are positioned relative to the sources of sound. For instance, in the illustrated example of FIG. 1, the angles 114-136 are in a plane generally parallel with the base 102 of the computing device 100 with the lid 104 in an upright or open position in which the lid extends generally transverse to the plane of the angles 114-136 and the base 102. Further, in the illustrated example, the microphones 106, 108 are spaced apart horizontally along the lid 104 such that the microphones 106, 108 are arranged in a line that is substantially parallel to the plane of the angles 114, 136 regardless of the particular orientation of the lid 104 relative to the base 102.

While the alignment of the microphones 106, 108 remains parallel to the plane of the angles 114-136 regardless of the orientation of the lid 104, the spatial relationship of the microphones 106, 108 relative to the surrounding area still changes as the orientation of the lid 104 changes. For example, when the lid 104 is in the generally upright or open position, shown in the illustrated example, the microphones 106, 108 are oriented to face toward the front of the computing device 100 (e.g., in a user facing direction toward the 90° position). In such a position, there is an unobstructed path towards the microphones 106, 108 from locations associated with angles in a front 180 degree region that include the second through sixth angles 116-124. Further, when the lid 104 is in the upright or open position shown in FIG. 1, the backside or top side of the lid 104 obstructs a direct path toward the microphones 106, 108 from locations associated with angles in a back 180 degree region that include the eighth through twelfth angles 118-136. As a result, sound originating from behind the computing device 100 may have a slightly different frequency signature than sound originating from in front of the computing device 100 even if the two locations are complementary to result in the same TDOA between the two microphones. These differences in frequency signatures may be reflected in the segment 214 of the cross-correlation vector 210 that serves as an input to the machine learning model, thereby enabling the system to distinguish between the a sound source located in a direction anywhere across the front 180 degree region in front of the computing device 100 from a sound source located in a direction anywhere across the back 180 degree region behind the computing device 100.

Notably, if the lid 104 was extended further back than what is shown in FIG. 1 until the lid 104 is substantially parallel with the base 102 and the plane of the angles 114-136, the microphones 106, 108 would face upwards in a direction transverse to the plane of the angles 114-136 rather than forwards towards the 90° position. In this upward facing position, there is an unobstructed path towards the microphones 106, 108 from all directions across the full 360° space surrounding the computing device 100 (assuming the locations are above the plane defined by the front surface 110 of the lid 104 where the microphones 106, 108 are located). As such, sounds originating from the back 180 degree region are no longer obstructed by the backside of the lid 104. While this may alter the frequency signature of such sounds as detected by the microphones 106, 104 relative to when the lid 104 is in the upright position shown in FIG. 1, in some examples, the sound source location analyzer 138 may nevertheless still be able to distinguish the location of sounds across the full 360 degree area surrounding the computing device 100. However, in some examples, different machine learning models may be used to account for the different orientations of the computing device 100.

Figure 3:
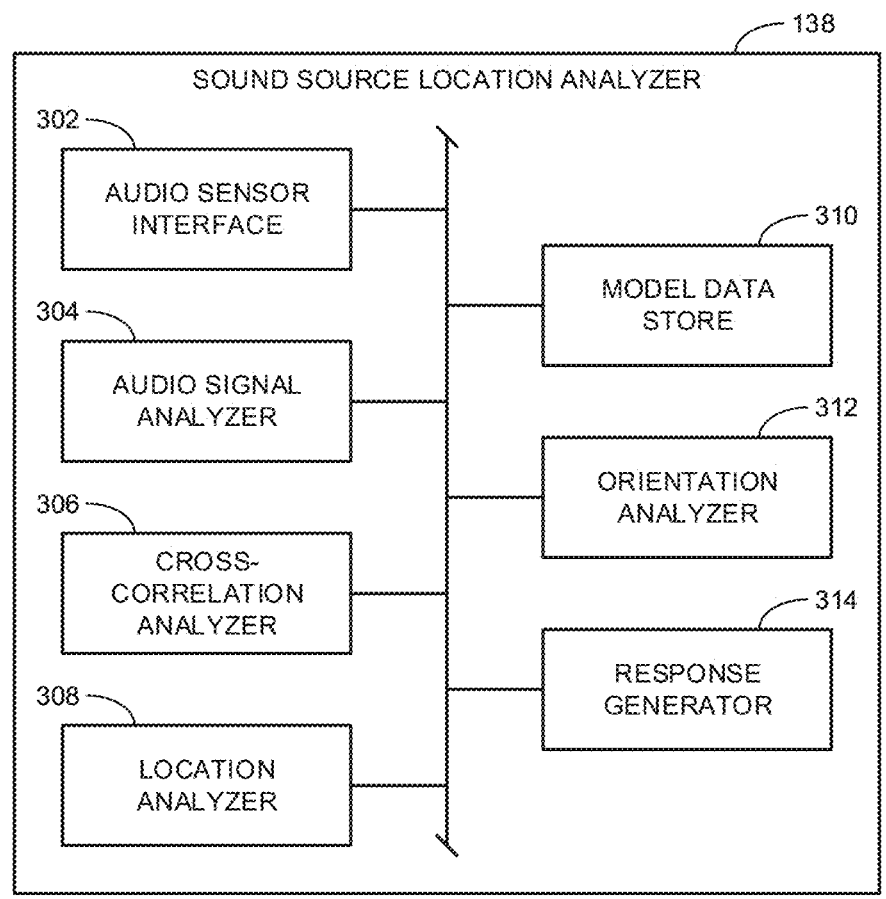
FIG. 3 is a block diagram of the example sound source location analyzer of FIG. 1.

FIG. 3 is a block diagram of the example sound source location analyzer 138 of FIG. 1. In the illustrated example, the sound source location analyzer 138 includes an example audio sensor interface 302, an example audio signal analyzer 304, an example cross-correlation analyzer 306, an example location analyzer 308, an example model data store 310, an example orientation analyzer 312, and an example response generator 314.

The example audio sensor interface 302 receives audio feedback signals from the microphones 106, 108 and provides the same to the example audio signal analyzer 304. The example audio signal analyzer 304 may pre-process the audio signals from the microphone 106, 108. In some examples, the audio signal analyzer 304 identifies and/or isolates individual signal frames or audio blocks (e.g., the signal frames 206, 208) for analysis on an ongoing basis. In some examples, successive ones of the signal frames overlap in time. That is, the ending of one signal frame may occur after the beginning of a subsequent signal frame. In other examples, the ending of one signal frame corresponds to the beginning of a subsequent signal frame. In some examples, the audio signals are stored in memory (e.g., a buffer) to enable the isolation and/or extraction of the different signal frames over time. In some examples, the signal frames 206, 208 are defined to correspond to relative short periods of time (e.g., less than 100 microseconds) to enable ongoing and substantially real-time analysis of sounds captured by the microphones 106, 108. Further, in some examples, the audio signal analyzer 304 normalizes the signal frames 206, 208 to reduce (e.g., eliminate) the effect of each microphone 106, 108 having a slightly different gain than the other.

The example cross-correlation analyzer 306 takes the pre-processed time-domain vectors corresponding to the two signal frames 206, 208 and calculates a corresponding cross-correlation vector (e.g., the cross-correlation vector 210). More particularly, in some examples, the vector corresponds to the output of a GCC-PHAT analysis of the signal frames 206, 208. Further, in some examples, the example cross-correlation analyzer 306 identifies and/or isolates a particular segment 214 of the cross-correlation vector 210. In some examples, the segment 214 corresponds to a fixed proportion of a mid-section of the cross-correlation vector 210 that includes at least a threshold number of the values of the full cross-correlation vector 210 (e.g., at least twice the number of samples corresponding to the maximum expected time delay between the two microphones 106, 108 detecting a particular sound). In some examples, the size of the segment 214 may be adjusted to strike an appropriate balance between accuracy of the sound source location detection and computational efficiency.

The example location analyzer 308 implements or executes a machine learning model (e.g., a trained neural network) to analyze the segment 214 of the cross-correlation vector 210 to estimate or determine a location or direction of a source of sound corresponding to the audio signals used in generating the cross-correlation vector 210. In some examples, the machine learning model is stored in the example model data store 310. In some examples, multiple different machine learning models may be maintained in the model data store 310. In some such examples, the location analyzer 308 determines which of the models to use based on orientation information provided by the orientation analyzer 312. That is, in some examples, the example orientation analyzer 312 determines the orientation of the computing device 100 based on feedback from one or more orientation sensors of the computing device 100 (e.g., an accelerometer, a gyroscope, a magnetometer, a laptop hinge sensor, etc.). More particularly, in the case of a laptop, the orientation analyzer 312 may determine the orientation of the lid 104 of the computing device 100 relative to the base 102 and/or relative to a surrounding environment. Based on the orientation of the computing device 100, the example location analyzer 308 may select a particular machine learning model to execute. In some examples, a single machine learning model may account for multiple different orientations of the computing device such that the orientation analyzer 312 is unnecessary. In other examples, a machine learning model that accounts for multiple different orientations may use orientation information generated by the orientation analyzer 312 as an input. In some examples, if a particular orientation is determined to make the outputs of a machine learning model unreliable, the location analyzer 308 may determine to suppress the execution of the machine learning model and/or to flag the output of the machine learning model as suspect. In some examples, the output of the machine learning model identifies a particular angle or direction corresponding to the estimated location or direction of the source of a detected sound.

The example response generator 314 generates and/or implements a response based on the output (e.g., the angle or direction) of the machine learning model. In some examples, the response may be a signal or trigger that activates another component of the computing device 100 to implement further action. In some examples, the response corresponds to speech recognition and/or voice recognition of a person speaking within detection range of the microphones 106, 108. In some examples, the response may include determining a context of the computing device 100 and/or trigger a particular action in response to the determined context. In some examples, the response may include adjusting the audio processing of feedback signals generated by the microphones to either isolate and/or focus on a detected sounds when relevant to the operation of the computing device 100 (e.g., a user speaking) or to reduce and/or cancel out the detected sounds when not relevant to the operation of the computing device (e.g., interfering background noise). For example, if the detected sound is determined to come from a direction that is within a threshold angle (e.g., 15°, 30°, 45°, 60°, etc.) of an expected user direction (e.g., in front of the computing device 100 at the 90° position in FIG. 1), the sound may be assumed to come from a user of the computing device 100 such that the response includes identifying the sound as originating from the user and/or isolating the sound for further processing (e.g., to perform speech and/or voice recognition analysis). On the other hand, if the detected sound is determined to come from a direction that is outside the threshold angle of an expected user direction (e.g., in front of the computing device 100 at the 90° position in FIG. 1), the sound may be assumed to be background noise such that the response includes disregarding the sound and/or reducing and/or cancelling out noise associated with the sound.

While an example manner of implementing the sound source location analyzer 138 of FIG. 1 is illustrated in FIG. 3, one or more of the elements, processes and/or devices illustrated in FIG. 3 may be combined, divided, re-arranged, omitted, eliminated and/or implemented in any other way. Further, the example audio sensor interface 302, the example audio signal analyzer 304, the example cross-correlation analyzer 306, the example location analyzer 308, the example model data store 310, the example orientation analyzer 312, the example response generator 314 and/or, more generally, the example sound source location analyzer 138 of FIG. 3 may be implemented by hardware, software, firmware and/or any combination of hardware, software and/or firmware. Thus, for example, any of the example audio sensor interface 302, the example audio signal analyzer 304, the example cross-correlation analyzer 306, the example location analyzer 308, the example model data store 310, the example orientation analyzer 312, the example response generator 314 and/or, more generally, the example sound source location analyzer 138 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example audio sensor interface 302, the example audio signal analyzer 304, the example cross-correlation analyzer 306, the example location analyzer 308, the example model data store 310, the example orientation analyzer 312, and/or the example response generator 314 is/are hereby expressly defined to include a non-transitory computer readable storage device or storage disk such as a memory, a digital versatile disk (DVD), a compact disk (CD), a Blu-ray disk, etc. including the software and/or firmware. Further still, the example sound source location analyzer 138 of FIG. 1 may include one or more elements, processes and/or devices in addition to, or instead of, those illustrated in FIG. 3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 4:
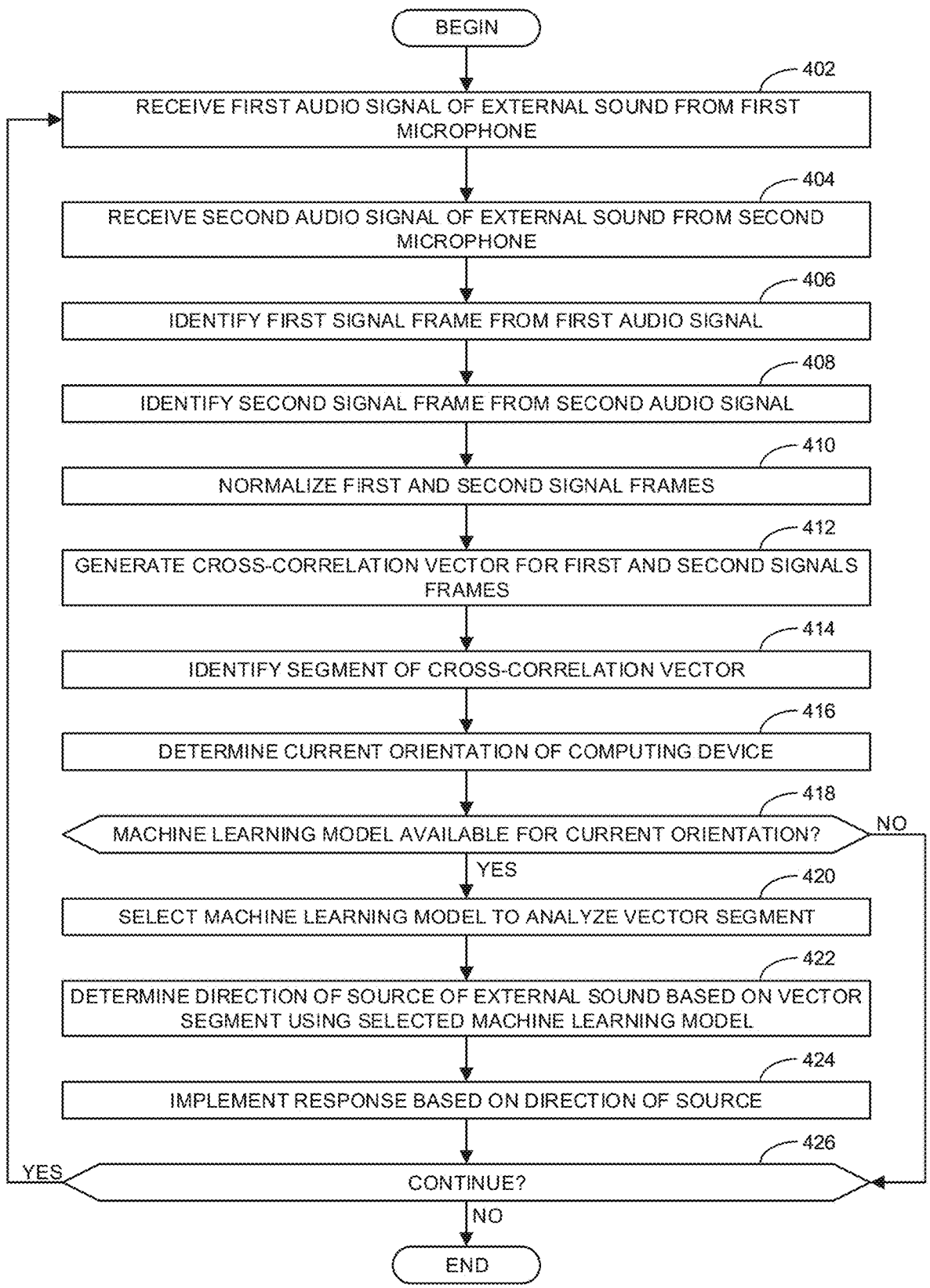
FIG. 4 is a flowchart representative of example machine readable instructions that may be executed to implement the example sound source location analyzer of FIGS. 1 and/or 3.

A flowchart representative of example hardware logic, machine readable instructions, hardware implemented state machines, and/or any combination thereof for implementing the sound source location analyzer 138 of FIGS. 1 and/or 3 is shown in FIG. 4. The machine readable instructions may be one or more executable programs or portion(s) of an executable program for execution by a computer processor and/or processor circuitry, such as the processor 712 shown in the example processor platform 700 discussed below in connection with FIG. 7. The program may be embodied in software stored on a non-transitory computer readable storage medium such as a CD-ROM, a floppy disk, a hard drive, a DVD, a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowchart illustrated in FIG. 4 to cause a machine to implement the operations outlined in the flowchart, many other methods of implementing the example sound source location analyzer 138 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIG. 4 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

The program of FIG. 4 begins at block 402 where the example audio sensor interface 302 receives a first audio signal of an external sound from a first microphone (e.g., the microphone 106 of FIG. 1). At block 404, the example audio sensor interface 302 receives a second audio signal of the external sound from a second microphone (e.g., the microphone 108 of FIG. 1). At block 406, the example audio signal analyzer 304 identifies a first signal frame (e.g., the first signal frame 206 of FIG. 2) from the first audio signal. At block 408, the example audio signal analyzer 304 identifies a second signal frame (e.g., the second signal frame 208 of FIG. 2) from the second audio signal. At block 410, the example audio signal analyzer 304 normalizes the first and second signal frames 206, 208.

At block 412, the example cross-correlation analyzer 306 generates a cross-correlation vector (e.g., the cross-correlation vector 210 of FIG. 2) corresponding to the first and second signal frames 206, 208. At block 414, the example cross-correlation analyzer 306 identifies a segment (e.g., the segment 214 of FIG. 2) of the cross-correlation vector 210. At block 416, the example orientation analyzer 312 determines a current orientation of the computing device 100. As used herein, determining an orientation of the computing device 100 includes determining an orientation of a portion of the computing device 100 including the microphones 106, 108 (e.g., the orientation of the lid 104 of a laptop). At block 418, the example location analyzer 308 determines whether there is a machine learning model available for the current orientation. If so, control advances to block 420 where the example location analyzer 308 selects the machine learning model to analyze the vector segment 214. In some examples, the orientation of the computing device 100 may be assumed and/or there may only be one machine learning model. In some such examples, blocks 416-420 may be omitted. At block 422, the example location analyzer 308 determines the direction of the source of the external sound based on the vector segment using the selected machine learning model.

At block 424, the example response generator 314 implements a response based on the direction of the source. Thereafter, control advances to block 426. Returning to block 418, if the example location analyzer 308 determines that there is no machine learning model available for the current orientation, control advances directly to block 426. At block 426, the example sound source location analyzer 138 determines whether to continue. If so, control returns to block 402 to repeat the process. Otherwise, the example program of FIG. 4 ends.

Experimental testing has confirmed that systems implementing examples disclosed herein are able to identify the location or direction of a source of sound across a 360 degree space surrounding a computing device using the audio feedback signals of only two microphones with a relatively high degree of accuracy (e.g., greater than 95% accuracy). In particular, a computing device with a form factor similar to the laptop shown in FIG. 1 was tested by using the two microphones 106, 108 to capture voice recordings made at 30 degree intervals surrounding the computing device (e.g., at the locations of the angles 114-136 shown in FIG. 1) at a distance of approximately 3 meters. The recordings at each angle 114-136 lasted for approximately 4 minutes and were captured by the microphones 106, 108 at a sampling frequency of approximately 48 kHz. Successive, individual signal frames of 8192 samples (corresponding to approximately 17 ms) from each audio signal were used to generate corresponding cross-correlation vectors (e.g., the cross-correlation vector 210 of FIG. 2). Truncated midsections or segments 214 of the cross-correlation vectors 210 were then used as feature inputs for a single layer 64-neuron shallow neural network classifier. The classifier was configured to have 13 classes including 12 classes for the angles from 0° to 330° in 30° intervals (as shown in FIG. 1) and one no noise class (e.g., a junk class).

The vector segments 214 of the cross-correlation of the different signal frames 206, 208 were labelled with the position (e.g., angle 114-136) at which the recordings were made to serve as ground truth training data to train the neural network. More particular, this training data was divided between 272,000 training blocks, 58,300 validation blocks, and 58,300 testing blocks.

Figure 5:
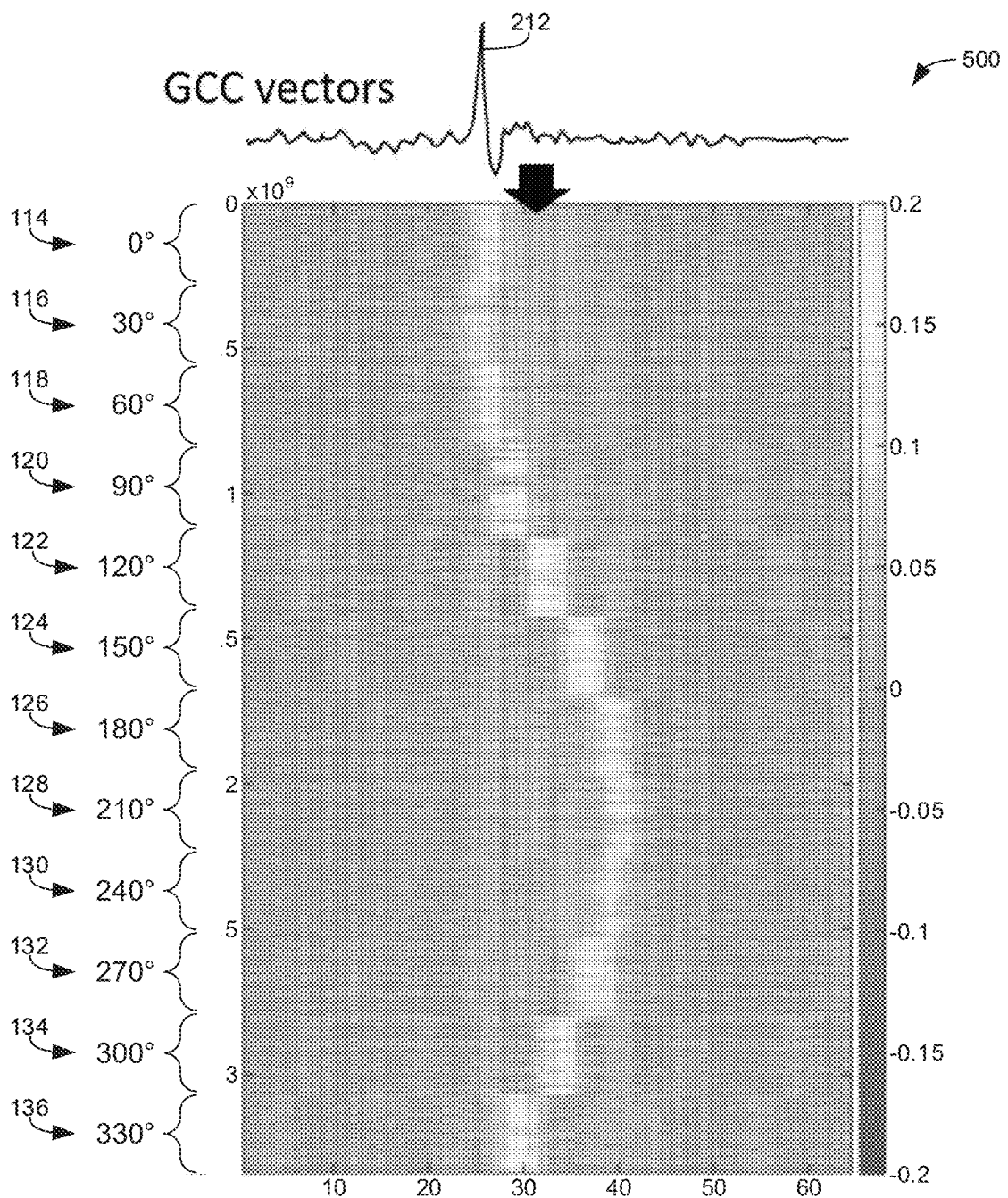
FIG. 5 is a heatmap representative of experimental data used as inputs for a machine learning model implemented in accordance with teachings disclosed herein.

FIG. 5 is a heatmap 500 that represents the feature extraction of all samples (e.g., all segmented cross-correlation vectors) captured at each angle 114-136. More particularly, the samples corresponding to each angle 114-136 are grouped in blocks in the heatmap with the samples associated with the first angle 114 (e.g., corresponding to the 0° position) at the top of the heatmap 500 and the last angle 136 (e.g., corresponding to the 330° position) at the bottom of the heatmap 500. The X-axis (corresponding to the width of the heatmap 500) represents the length or number of vector elements included in the segment 214 of the cross-correlation vector 210 used in the analysis. The color or shading on the heatmap 500 is representative of the value of the elements in each vector segment, with the lightest colored regions correspond to the peak value 212 in each vector segment 214. Thus, as shown in the heatmap 500 of FIG. 5, the position of the peak value 212 changes as the recordings were captured from the different angles 114-136, thereby making it possible to identify the particular angle 114-136 associated with any given sound recording. However, the positions of the peak values 212 along the X-axis in FIG. 5 associated with the fifth angle 122 (e.g., the 120° position) are approximately the same as the positions of the peak values 212 associated with the eleventh angle 134 (e.g., the 300° position) even though the two angles are 180 degrees apart. As such, the position of the peak value 212 is insufficient by itself to determine the location of a source of sound across a full 360 degree area.

Figure 6:
FIG. 6 is a confusion matrix indicating the accuracy of the outputs of the machine learning model based on the experimental data represented in FIG. 5.

However, by providing the values in the vector segment 214 surrounding the peak value 212 as inputs to the machine learning model, as disclosed herein, it is possible to reliable identify sound originating from any one of the angles 114-136. This is demonstrated by the confusion matrix 600 of FIG. 6, which indicates an accuracy of greater than 96% across all angles around a full 360 degrees of rotation.

Figure 7:
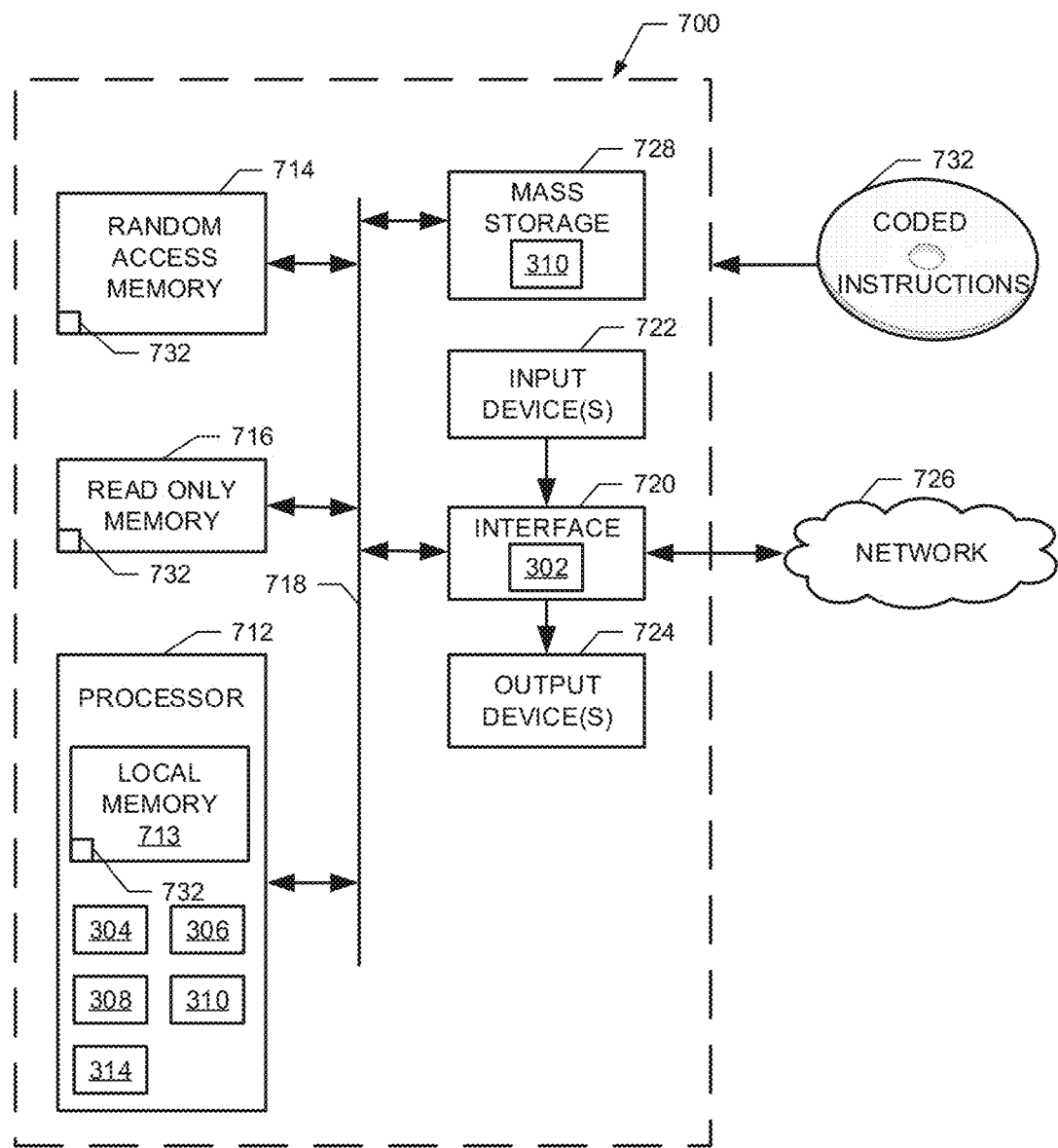
FIG. 7 is a block diagram of an example processing platform structured to execute the instructions of FIG. 4 to implement the example sound source location analyzer of FIGS. 1 and/or 3.

FIG. 7 is a block diagram of an example processor platform 700 structured to execute the instructions of FIG. 4 to implement the sound source location analyzer 138 of FIGS. 1 and/or 3. The processor platform 700 can be, for example, a server, a personal computer, a workstation, a self-learning machine (e.g., a neural network), a mobile device (e.g., a cell phone, a smart phone, a tablet such as an iPad), a personal digital assistant (PDA), an Internet appliance, or any other type of computing device.

The processor platform 700 of the illustrated example includes a processor 712. The processor 712 of the illustrated example is hardware. For example, the processor 712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example audio signal analyzer 304, the example cross-correlation analyzer 306, the example location analyzer 308, the example orientation analyzer 312, and the example response generator 314.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), a Bluetooth® interface, a near field communication (NFC) interface, and/or a PCI express interface. In this example, the interface circuit 720 implements the example audio sensor interface 302.

In the illustrated example, one or more input devices 722 are connected to the interface circuit 720. The input device(s) 722 permit(s) a user to enter data and/or commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 720 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 700 of the illustrated example also includes one or more mass storage devices 728 for storing software and/or data. Examples of such mass storage devices 728 include floppy disk drives, hard drive disks, compact disk drives, Blu-ray disk drives, redundant array of independent disks (RAID) systems, and digital versatile disk (DVD) drives. In this example, the mass storage device 728 includes the example model data store 310.

The machine executable instructions 732 of FIG. 4 may be stored in the mass storage device 728, in the volatile memory 714, in the non-volatile memory 716, and/or on a removable non-transitory computer readable storage medium such as a CD or DVD.

From the foregoing, it will be appreciated that example methods, apparatus and articles of manufacture have been disclosed that enable the 360 degree detection of a source of sound using the audio signals of no more than two microphones. As a result, sound source location detection may be implemented in a more cost effective manner because examples disclosed herein do not require larger arrays of microphones as is common in other sound source detection systems. Furthermore, examples disclosed herein achieve relatively high accuracy (e.g., greater than 95%) using a shallow neural network that does not require the same computational capacity of existing approaches that rely on computationally intensive cross-correlations based on FFT calculations and/or deep learning algorithms. Therefore, example disclosed herein improve the efficiency of using a computing device by reducing the demand on computational overhead. The disclosed methods, apparatus and articles of manufacture are accordingly directed to one or more improvement(s) in the functioning of a computer.

Example methods, apparatus, systems, and articles of manufacture to detect the location of sound sources external to computing devices are disclosed herein. Further examples and combinations thereof include the following:

Example 1 includes an apparatus to determine a direction of a source of a sound relative to a computing device, the apparatus comprising a cross-correlation analyzer to generate a vector of values corresponding to a cross-correlation of first and second audio signals corresponding to the sound, the first audio signal received from a first microphone of the computing device, the second audio signal received from a second microphone of the computing device, and a location analyzer to use a machine learning model and a set of the values of the vector to determine the direction of the source of the sound.

Example 2 includes the apparatus of example 1, wherein the location analyzer is to use the machine learning model to determine the direction of the source of the sound across 360 degrees of space surrounding the computing device without feedback from additional microphones other than the first and second microphones.

Example 3 includes the apparatus of any one of examples 1 and 2, wherein the machine learning model is to distinguish between a first source of sound located in front of the computing device and a second source of sound located behind the computing device.

Example 4 includes the apparatus of any one of examples 1-3, wherein the first and second microphones are to be spaced apart on a surface of the computing device, the first and second microphones facing a same direction as the surface.

Example 5 includes the apparatus of example 4, further including using the machine learning model to determine the direction of the source of the sound from among a plurality of possible directions, the plurality of possible directions including first directions distributed across a front 180 degree region and second directions distributed across a back 180 degree region, the front 180 degree region corresponding to an area in front of the surface, the back 180 degree region corresponding to an area behind the surface.

Example 6 includes the apparatus of any one of examples 1-5, wherein the vector corresponds to a generalized cross correlation with phase transform of the first and second audio signals.

Example 7 includes the apparatus of any one of examples 1-6, wherein the set of the values corresponds to less than all values in the vector.

Example 8 includes the apparatus of any one of examples 1-7, wherein the set of the values corresponds to a segment of the vector including more than 1% of all of the values.

Example 9 includes the apparatus of any one of examples 1-8, wherein the set of the values corresponds to a segment of the vector including at least a threshold number of the values, the threshold number being at least twice a number of samples corresponding to a time difference of arrival for a sound originating at a point collinear with the first and second microphones.

Example 10 includes the apparatus of any one of examples 1-9, wherein the set of values corresponds to a mid-section of the vector, the mid-section excluding ones of the values on either side of the mid-section.

Example 11 includes the apparatus of any one of examples 1-10, wherein the set of the values corresponds to a segment of the vector that surrounds a peak value in the vector.

Example 12 includes the apparatus of any one of examples 1-11, further including a response generator to generate a response based on the direction of the source of the sound.

Example 13 includes the apparatus of example 12, wherein the response generator is to at least one of isolate the sound when the direction of the source of the sound is within a threshold angle of a first direction, or reduce noise associated with the sound when the direction of the source of the sound is outside of the threshold angle of the first direction.

Example 14 includes the apparatus of example 12, wherein the response generator is to in response to the direction of the source corresponding to a front of the computing device, identify the sound as originating from a user of the computing device, and in response to the direction of the source corresponding to a rear of the computing device, disregard the sound.

Example 15 includes the apparatus of any one of examples 1-14, wherein the machine learning model is implemented by a shallow neural network.

Example 16 includes a non-transitory computer readable medium comprising instructions that, when executed, cause a machine to at least generate a vector of values corresponding to a cross-correlation of first and second audio signals corresponding to a sound, the first audio signal received from a first microphone of a computing device, the second audio signal received from a second microphone of the computing device, and using a machine learning model and a set of the values of the vector to determine a direction of a source of the sound.

Example 17 includes the computer readable medium of example 16, wherein the instructions further cause the machine to use the machine learning model to determine the direction of the source of the sound across 360 degrees of space surrounding the computing device without feedback from additional microphones other than the first and second microphones.

Example 18 includes the computer readable medium of any one of examples 16 and 17, wherein the machine learning model is to distinguish between a first source of sound located in front of the computing device and a second source of sound located behind the computing device.

Example 19 includes the computer readable medium of any one of examples 16-18, wherein the first and second microphones are to be spaced apart on a surface of the computing device, the first and second microphones facing a same direction as the surface.

Example 20 includes the computer readable medium of example 19, wherein the instructions further cause the machine to use the machine learning model to determine the direction of the source of the sound from among a plurality of possible directions, the plurality of possible directions including first directions distributed across a front 180 degree region and second directions distributed across a back 180 degree region, the front 180 degree region corresponding to an area in front of the surface, the back 180 degree region corresponding to an area behind the surface.

Example 21 includes the computer readable medium of any one of examples 16-20, wherein the vector corresponds to a generalized cross correlation with phase transform of the first and second audio signals.

Example 22 includes the computer readable medium of any one of examples 16-21, wherein the set of the values corresponds to less than all values in the vector.

Example 23 includes the computer readable medium of any one of examples 16-22, wherein the set of the values corresponds to a segment of the vector including more than 1% of all of the values.

Example 24 includes the computer readable medium of any one of examples 16-23, wherein the set of the values corresponds to a segment of the vector including at least a threshold number of the values, the threshold number being at least twice a number of samples corresponding to a time difference of arrival for a sound originating at a point collinear with the first and second microphones.

Example 25 includes the computer readable medium of any one of examples 16-24, wherein the set of values corresponds to a mid-section of the vector, the mid-section excluding ones of the values on either side of the mid-section.

Example 26 includes the computer readable medium of any one of examples 16-25, wherein the set of the values corresponds to a segment of the vector that surrounds a peak value in the vector.

Example 27 includes the computer readable medium of any one of examples 16-26, wherein the instructions further cause the machine to generate a response based on the direction of the source of the sound.

Example 28 includes the computer readable medium of example 27, wherein the instructions further cause the machine to at least one of isolate the sound when the direction of the source of the sound is within a threshold angle of a first direction, or reduce noise associated with the sound when the direction of the source of the sound is outside of the threshold angle of the first direction.

Example 29 includes the computer readable medium of example 27, wherein the instructions further cause the machine to in response to the direction of the source corresponding to a front of the computing device, identify the sound as originating from a user of the computing device, and in response to the direction of the source corresponding to a rear of the computing device, disregard the sound.

Example 30 includes the computer readable medium of any one of examples 16-29, wherein the machine learning model is implemented by a shallow neural network.

Example 31 includes a method to determine a direction of a source of a sound relative to a computing device, the method comprising generating a vector of values corresponding to a cross-correlation of first and second audio signals corresponding to the sound, the first audio signal received from a first microphone of the computing device, the second audio signal received from a second microphone of the computing device, and using a machine learning model and a set of the values of the vector to determine the direction of the source of the sound.

Example 32 includes the method of example 31, further including using the machine learning model to determine the direction of the source of the sound across 360 degrees of space surrounding the computing device without feedback from additional microphones other than the first and second microphones.

Example 33 includes the method of any one of examples 31 and 32, wherein the machine learning model is to distinguish between a first source of sound located in front of the computing device and a second source of sound located behind the computing device.

Example 34 includes the method of any one of examples 31-33, wherein the first and second microphones are to be spaced apart on a surface of the computing device, the first and second microphones facing a same direction as the surface.

Example 35 includes the method of example 34, further including using the machine learning model to determine the direction of the source of the sound from among a plurality of possible directions, the plurality of possible directions including first directions distributed across a front 180 degree region and second directions distributed across a back 180 degree region, the front 180 degree region corresponding to an area in front of the surface, the back 180 degree region corresponding to an area behind the surface.

Example 36 includes the method of any one of examples 31-35, wherein the vector corresponds to a generalized cross correlation with phase transform of the first and second audio signals.

Example 37 includes the method of any one of examples 31-36, wherein the set of the values corresponds to less than all values in the vector.

Example 38 includes the method of any one of examples 31-37, wherein the set of the values corresponds to a segment of the vector including more than 1% of all of the values.

Example 39 includes the method of any one of examples 31-38, wherein the set of the values corresponds to a segment of the vector including at least a threshold number of the values, the threshold number being at least twice a number of samples corresponding to a time difference of arrival for a sound originating at a point collinear with the first and second microphones.

Example 40 includes the method of any one of examples 31-39, wherein the set of values corresponds to a mid-section of the vector, the mid-section excluding ones of the values on either side of the mid-section.

Example 41 includes the method of any one of examples 31-40, wherein the set of the values corresponds to a segment of the vector that surrounds a peak value in the vector.

Example 42 includes the method of any one of examples 31-41, further including generating a response based on the direction of the source of the sound.

Example 43 includes the method of example 42, wherein the response includes at least one of isolate the sound when the direction of the source of the sound is within a threshold angle of a first direction, or reduce noise associated with the sound when the direction of the source of the sound is outside of the threshold angle of the first direction.

Example 44 includes the method of example 42, wherein the response includes in response to the direction of the source corresponding to a front of the computing device, identifying the sound as originating from a user of the computing device, and in response to the direction of the source corresponding to a rear of the computing device, disregarding the sound.

Example 45 includes the method of any one of examples 31-44, wherein the machine learning model is implemented by a shallow neural network.

Example 46 includes an apparatus to determine a direction of a source of a sound relative to a computing device, the apparatus comprising means for generating a vector of values corresponding to a cross-correlation of first and second audio signals corresponding to the sound, the first audio signal received from a first microphone of the computing device, the second audio signal received from a second microphone of the computing device, and means for using a machine learning model and a set of the values of the vector to determine the direction of the source of the sound.

Example 47 includes the apparatus of example 46, wherein the means for using the machine learning model is to determine the direction of the source of the sound across 360 degrees of space surrounding the computing device without feedback from additional microphones other than the first and second microphones.

Example 48 includes the apparatus of any one of examples 46 and 47, wherein the machine learning model is to distinguish between a first source of sound located in front of the computing device and a second source of sound located behind the computing device.

Example 49 includes the apparatus of any one of examples 46-48, wherein the first and second microphones are to be spaced apart on a surface of the computing device, the first and second microphones facing a same direction as the surface.

Example 50 includes the apparatus of example 49, wherein the means for using the machine learning model is to determine the direction of the source of the sound from among a plurality of possible directions, the plurality of possible directions including first directions distributed across a front 180 degree region and second directions distributed across a back 180 degree region, the front 180 degree region corresponding to an area in front of the surface, the back 180 degree region corresponding to an area behind the surface.

Example 51 includes the apparatus of any one of examples 46-50, wherein the vector corresponds to a generalized cross correlation with phase transform of the first and second audio signals.

Example 52 includes the apparatus of any one of examples 46-51, wherein the set of the values corresponds to less than all values in the vector.

Example 53 includes the apparatus of any one of examples 46-52, wherein the set of the values corresponds to a segment of the vector including more than 1% of all of the values.

Example 54 includes the apparatus of any one of examples 46-53, wherein the set of the values corresponds to a segment of the vector including at least a threshold number of the values, the threshold number being at least twice a number of samples corresponding to a time difference of arrival for a sound originating at a point collinear with the first and second microphones.

Example 55 includes the apparatus of any one of examples 46-54, wherein the set of values corresponds to a mid-section of the vector, the mid-section excluding ones of the values on either side of the mid-section.

Example 56 includes the apparatus of any one of examples 46-55, wherein the set of the values corresponds to a segment of the vector that surrounds a peak value in the vector.

Example 57 includes the apparatus of any one of examples 46-56, further including means for generating a response based on the direction of the source of the sound.

Example 58 includes the apparatus of example 57, wherein the response generating means is to at least one of isolate the sound when the direction of the source of the sound is within a threshold angle of a first direction, or reduce noise associated with the sound when the direction of the source of the sound is outside of the threshold angle of the first direction.

Example 59 includes the apparatus of example 57, wherein the response generating means is to in response to the direction of the source corresponding to a front of the computing device, identify the sound as originating from a user of the computing device, and in response to the direction of the source corresponding to a rear of the computing device, disregard the sound.

Example 60 includes the apparatus of any one of examples 46-58, wherein the machine learning model is implemented by a shallow neural network.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus to determine a direction of a source of a sound relative to a computing device, the apparatus comprising:
  a cross-correlation analyzer to generate a vector of values corresponding to a cross-correlation of first and second audio signals corresponding to the sound, the first audio signal received from a first microphone of the computing device, the second audio signal received from a second microphone of the computing device; and
  a location analyzer to use a machine learning model and a set of the values of the vector to determine the direction of the source of the sound, the set of the values corresponding to a segment of the vector including at least a threshold number of the values of the vector, the threshold number being at least twice a number of samples corresponding to a time difference of arrival for a sound originating at a point collinear with the first and second microphones.

2. The apparatus of claim 1, wherein the location analyzer is to use the machine learning model to determine the direction of the source of the sound across 360 degrees of space surrounding the computing device without feedback from additional microphones other than the first and second microphones.

3. The apparatus of claim 1, wherein the machine learning model is to distinguish between a first source of sound located in front of the computing device and a second source of sound located behind the computing device.

4. The apparatus of claim 1, wherein the first and second microphones are to be spaced apart on a surface of the computing device, the first and second microphones facing a same direction as the surface.

5. The apparatus of claim 4, further including using the machine learning model to determine the direction of the source of the sound from among a plurality of possible directions, the plurality of possible directions including first directions distributed across a front 180 degree region and second directions distributed across a back 180 degree region, the front 180 degree region corresponding to an area in front of the surface, the back 180 degree region corresponding to an area behind the surface.

6. The apparatus of claim 1, wherein the vector corresponds to a generalized cross correlation with phase transform of the first and second audio signals.

7. The apparatus of claim 1, wherein the set of the values corresponds to less than all the values in the vector.

8. The apparatus of claim 1, wherein the segment of the vector includes more than 1% of all of the values.

9. The apparatus of claim 1, wherein the set of the values corresponds to a mid-section of the vector, the mid-section excluding ones of the values on either side of the mid-section.

10. The apparatus of claim 1, wherein the segment of the vector surrounds a peak value in the vector.

11. The apparatus of claim 1, further including a response generator to generate a response based on the direction of the source of the sound.

12. The apparatus of claim 11, wherein the response generator is to at least one of:
isolate the sound when the direction of the source of the sound is within a threshold angle of a first direction; or
reduce noise associated with the sound when the direction of the source of the sound is outside of the threshold angle of the first direction.

13. The apparatus of claim 11, wherein the response generator is to:
in response to the direction of the source corresponding to a front of the computing device, identify the sound as originating from a user of the computing device; and
in response to the direction of the source corresponding to a rear of the computing device, disregard the sound.

14. The apparatus of claim 1, wherein the machine learning model is implemented by a shallow neural network.

15. A non-transitory computer readable medium comprising instructions that, when executed, cause a machine to at least:
generate a vector of values corresponding to a cross-correlation of first and second audio signals corresponding to a sound, the first audio signal received from a first microphone of a computing device, the second audio signal received from a second microphone of the computing device; and
using a machine learning model and a set of the values of the vector to determine a direction of a source of the sound, the set of the values of the vector corresponds to a segment of the vector including at least a threshold number of the values, the threshold number being at least twice a number of samples corresponding to a time difference of arrival for a sound originating at a point collinear with the first and second microphones.

16. The computer readable medium of claim 15, wherein the instructions further cause the machine to use the machine learning model to determine the direction of the source of the sound across 360 degrees of space surrounding the computing device without feedback from additional microphones other than the first and second microphones.

17. The computer readable medium of claim 15, wherein the set of the values corresponds to less than all the values in the vector.

18. The computer readable medium of claim 15, wherein the set of the values corresponds to a mid-section of the vector, the mid-section excluding ones of the values on either side of the mid-section.

19. The computer readable medium of claim 15, wherein the instructions further cause the machine to generate a response based on the direction of the source of the sound.

20. A method to determine a direction of a source of a sound relative to a computing device, the method comprising:
generating a vector of values corresponding to a cross-correlation of first and second audio signals corresponding to the sound, the first audio signal received from a first microphone of the computing device, the second audio signal received from a second microphone of the computing device; and
using a machine learning model and a set of the values of the vector to determine the direction of the source of the sound, the set of the values of the vector corresponds to a segment of the vector including at least a threshold number of the values, the threshold number being at least twice a number of samples corresponding to a time difference of arrival for a sound originating at a point collinear with the first and second microphones.

21. The method of claim 20, further including using the machine learning model to determine the direction of the source of the sound across 360 degrees of space surrounding the computing device without feedback from additional microphones other than the first and second microphones.

22. An apparatus to determine a direction of a source of a sound relative to a computing device, the apparatus comprising:
means for generating a vector of values corresponding to a cross-correlation of first and second audio signals corresponding to the sound, the first audio signal received from a first microphone of the computing device, the second audio signal received from a second microphone of the computing device; and
means for using a machine learning model and a set of the values of the vector to determine the direction of the source of the sound, the set of the values of the vector corresponds to a segment of the vector including at least a threshold number of the values, the threshold number being at least twice a number of samples corresponding to a time difference of arrival for a sound originating at a point collinear with the first and second microphones.

23. The apparatus of claim 22, wherein the means for using the machine learning model is to determine the direction of the source of the sound across 360 degrees of space surrounding the computing device without feedback from additional microphones other than the first and second microphones.

24. The computer readable medium of claim 15, wherein the segment of the vector surrounds a peak value in the vector.

\* \* \* \* \*